US012545349B2

(12) United States Patent
Kashihara et al.

(10) Patent No.: US 12,545,349 B2
(45) Date of Patent: Feb. 10, 2026

(54) SADDLE-RIDE TYPE VEHICLE

(71) Applicant: KAWASAKI MOTORS, LTD., Akashi (JP)

(72) Inventors: Takeshi Kashihara, Akashi (JP); Taro Iwamoto, Akashi (JP); Hirokazu Kohara, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 543 days.

(21) Appl. No.: 18/078,912

(22) Filed: Dec. 9, 2022

(65) Prior Publication Data

US 2023/0182847 A1 Jun. 15, 2023

(30) Foreign Application Priority Data

Dec. 14, 2021 (JP) ................................ 2021-202467

(51) Int. Cl.
*B62J 45/00* (2020.01)
*B62K 11/04* (2006.01)

(52) U.S. Cl.
CPC .............. *B62J 45/00* (2020.02); *B62K 11/04* (2013.01)

(58) Field of Classification Search
CPC ... B62J 45/00; B62J 43/16; B62J 43/28; B62J 99/00; B62K 11/04; B62K 23/02
See application file for complete search history.

(56) References Cited

U.S. PATENT DOCUMENTS

| 3,779,597 | A | * | 12/1973 | Uchida | B62J 9/14 |
| | | | | | 297/188.1 |
| 5,040,632 | A | * | 8/1991 | Fujii | B62K 19/46 |
| | | | | | 296/65.05 |
| 2016/0229476 | A1 | * | 8/2016 | Yasuta | B62J 35/00 |
| 2017/0101151 | A1 | * | 4/2017 | Koishikawa | B62K 11/04 |
| 2017/0284347 | A1 | * | 10/2017 | Ozaki | B62J 43/20 |
| 2018/0339745 | A1 | * | 11/2018 | Nakamura | B60T 8/3685 |
| 2019/0077483 | A1 | * | 3/2019 | Futamata | B62M 7/02 |
| 2019/0176924 | A1 | * | 6/2019 | Iwata | B62J 43/28 |
| 2023/0242217 | A1 | * | 8/2023 | Aitcin | B62M 27/02 |
| | | | | | 180/193 |

FOREIGN PATENT DOCUMENTS

| EP | 3251932 A1 | | 6/2017 | |
| IN | 201000669-11 | * | 8/2010 | ............. B62J 23/00 |
| JP | 2004-175126 A | | 6/2004 | |
| JP | 2010-030471 A | | 2/2010 | |
| JP | 2010-130290 A | | 6/2010 | |
| JP | 2016068817 A | * | 5/2016 | |
| JP | 2017-213985 A | | 12/2017 | |

* cited by examiner

*Primary Examiner* — Drew J Brown
(74) *Attorney, Agent, or Firm* — PROCOPIO, CORY, HARGREAVES & SAVITCH LLP

(57) ABSTRACT

There is provided a saddle-ride type vehicle including: a vehicle body; a camera attached to the vehicle body; a recorder main body including a storage medium that stores imaging information captured by the camera; and a cover member detachably attached to the vehicle body as an exterior component and covering at least an access portion to the storage medium in the recorder main body when the cover member is attached.

8 Claims, 8 Drawing Sheets

SADDLE-RIDE TYPE VEHICLE

CROSS-REFERENCE TO RELATED APPLICATIONS

This application is based on and claims priority under 35 USC 119 from Japanese Patent Application No. 2021-202467 filed on Dec. 14, 2021, the contents of which are incorporated herein by reference.

TECHNICAL FIELD

The present disclosure relates to a saddle-ride type vehicle equipped with a camera for capturing.

BACKGROUND ART

There is known a saddle-ride type vehicle (motorcycle) disclosed in JP2004-175126A. The saddle-ride type vehicle includes a camera unit and a recorder main body (recording unit) that records an image captured by the camera unit. The recorder main body is integrated with an instrument panel that displays an engine rotation speed and a traveling speed, and is provided in the vicinity of a base portion of a handlebar. The recorder main body is provided with an insertion portion into which a detachable storage medium is inserted.

When the recorder main body is disposed at the same position as the instrument panel of a handle portion as in JP2004-175126A, there is an advantage that the storage medium can be easily inserted into and removed from the recorder main body, but there is a disadvantage that the storage medium is not sufficiently protected from, for example, an illegal act.

SUMMARY OF INVENTION

The present disclosure provides a saddle-ride type vehicle capable of appropriately protecting a recorder main body while ensuring accessibility to a storage medium.

According to an illustrative aspect of the present disclosure, a saddle-ride type vehicle includes: a vehicle body; a camera attached to the vehicle body; a recorder main body including a storage medium that stores imaging information captured by the camera; and a cover member detachably attached to the vehicle body as an exterior component and covering at least an access portion to the storage medium in the recorder main body when the cover member is attached.

According to the saddle-ride type vehicle of the present disclosure, it is possible to appropriately protect a recorder main body while ensuring accessibility to a storage medium.

DESCRIPTION OF EMBODIMENTS

Vehicle Body Structure of Motorcycle

Figure 1:
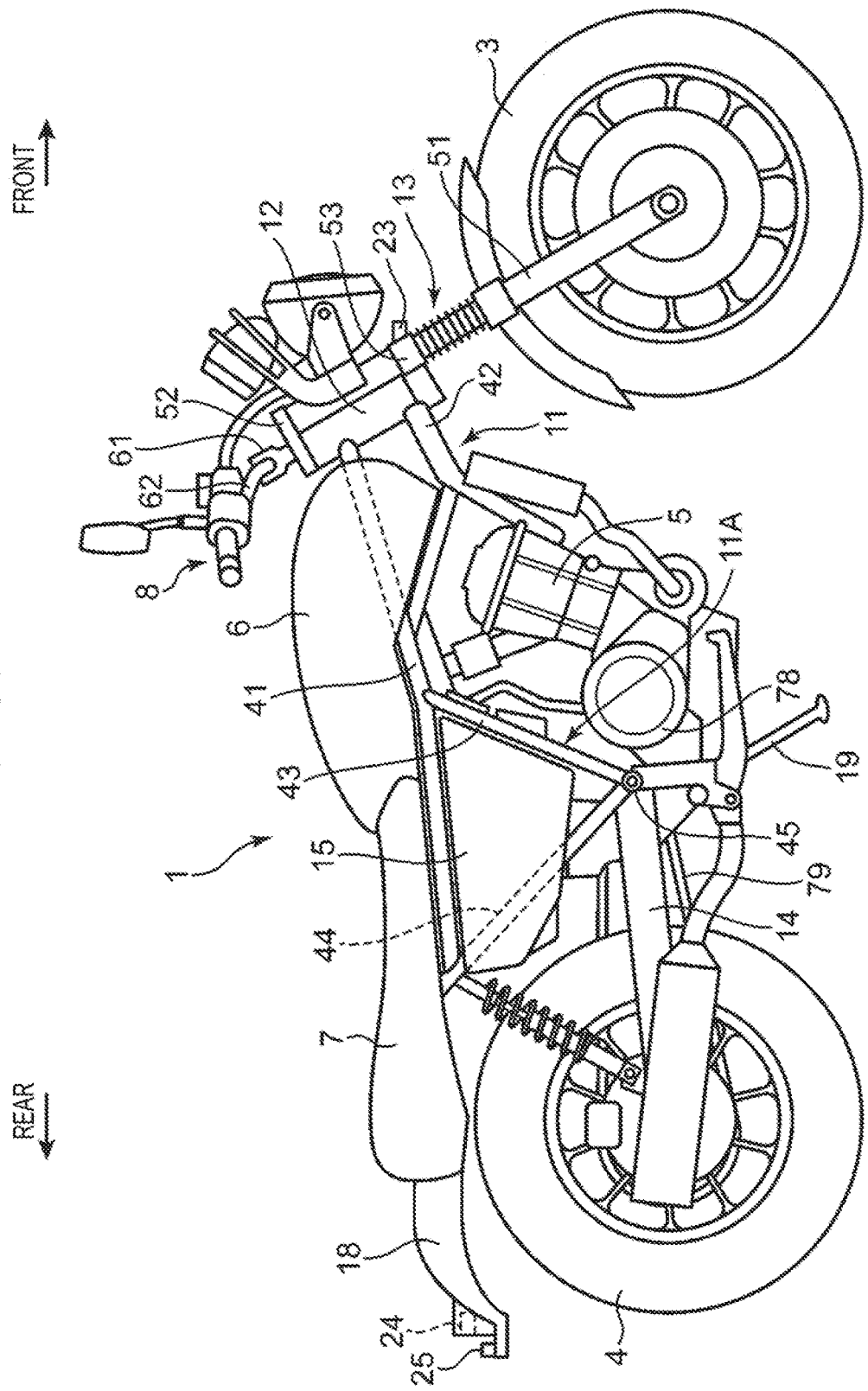
FIG. 1 is a side view of a motorcycle according to an embodiment of the present disclosure.

FIG. 1 is a side view of a motorcycle according to an embodiment of the present disclosure. As shown in FIG. 1, the motorcycle includes a vehicle body 1, a front wheel 3, a rear wheel 4, an engine 5, a fuel tank 6, a seat 7, and a handle 8. The front wheel 3 and the rear wheel 4 are a pair of front and rear wheels that movably support the vehicle body 1. The engine 5 is a driving source that generates a driving force for rotating the rear wheel 4, in other words, a driving force for driving the motorcycle. The fuel tank 6 is a tank that stores fuel to be supplied to the engine 5. The seat 7 is a seat on which an occupant (rider) who drives the motorcycle sits. The handle 8 is a steering handle that the occupant grips when steering the front wheel 3. In other words, the motorcycle according to the present embodiment is a two-wheeled automobile that travels by the driving force of the engine 5, and is a type of saddle-ride type vehicle.

Figure 2:
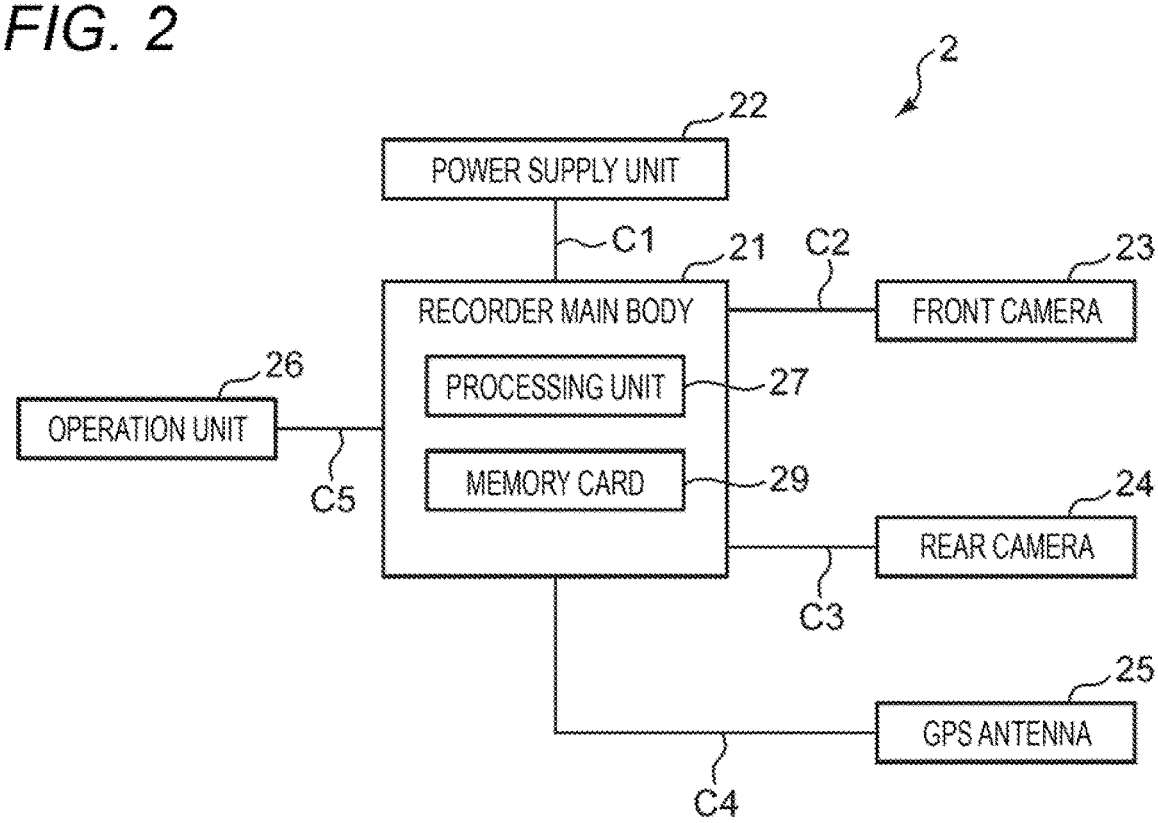
FIG. 2 is a functional block diagram showing an electrical configuration of a drive recorder mounted on the motorcycle.

A drive recorder 2 shown in FIG. 2 is mounted on the vehicle body 1. The drive recorder 2 is a device that records a video of surroundings of the vehicle body 1. Details of the drive recorder 2 will be described later.

Figure 3:
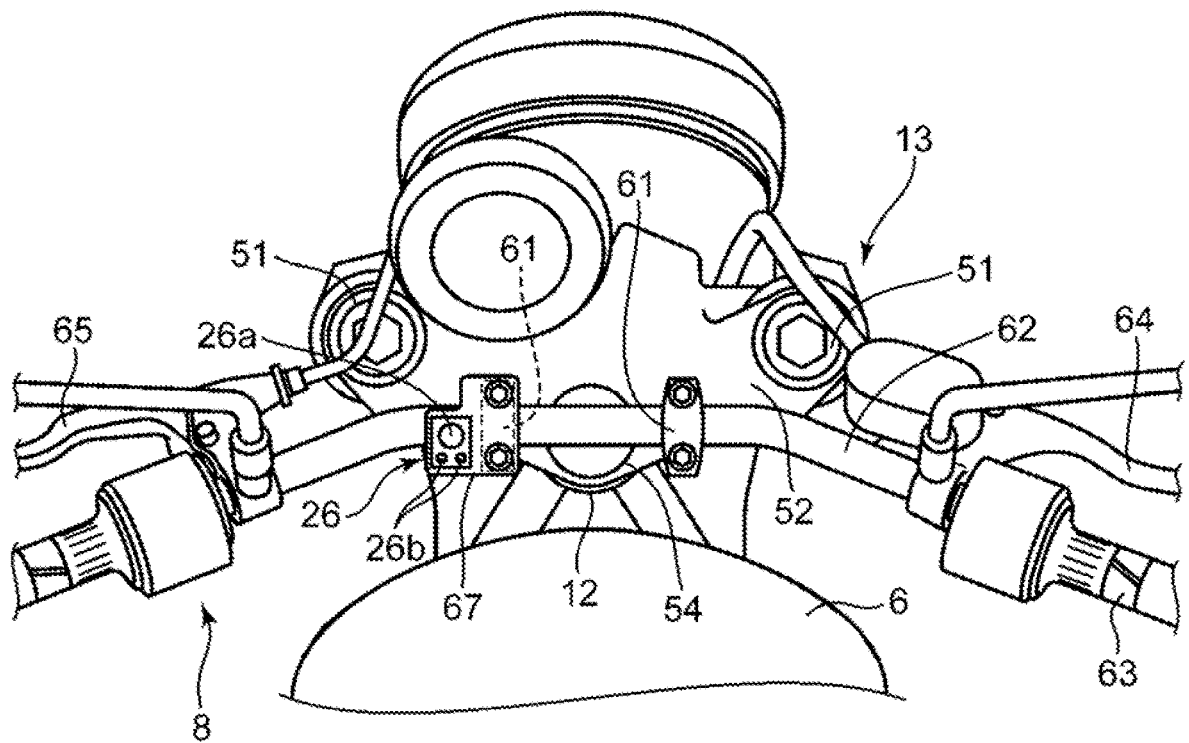
FIG. 3 is an enlarged plan view of a handle portion of the motorcycle.
Figure 4:
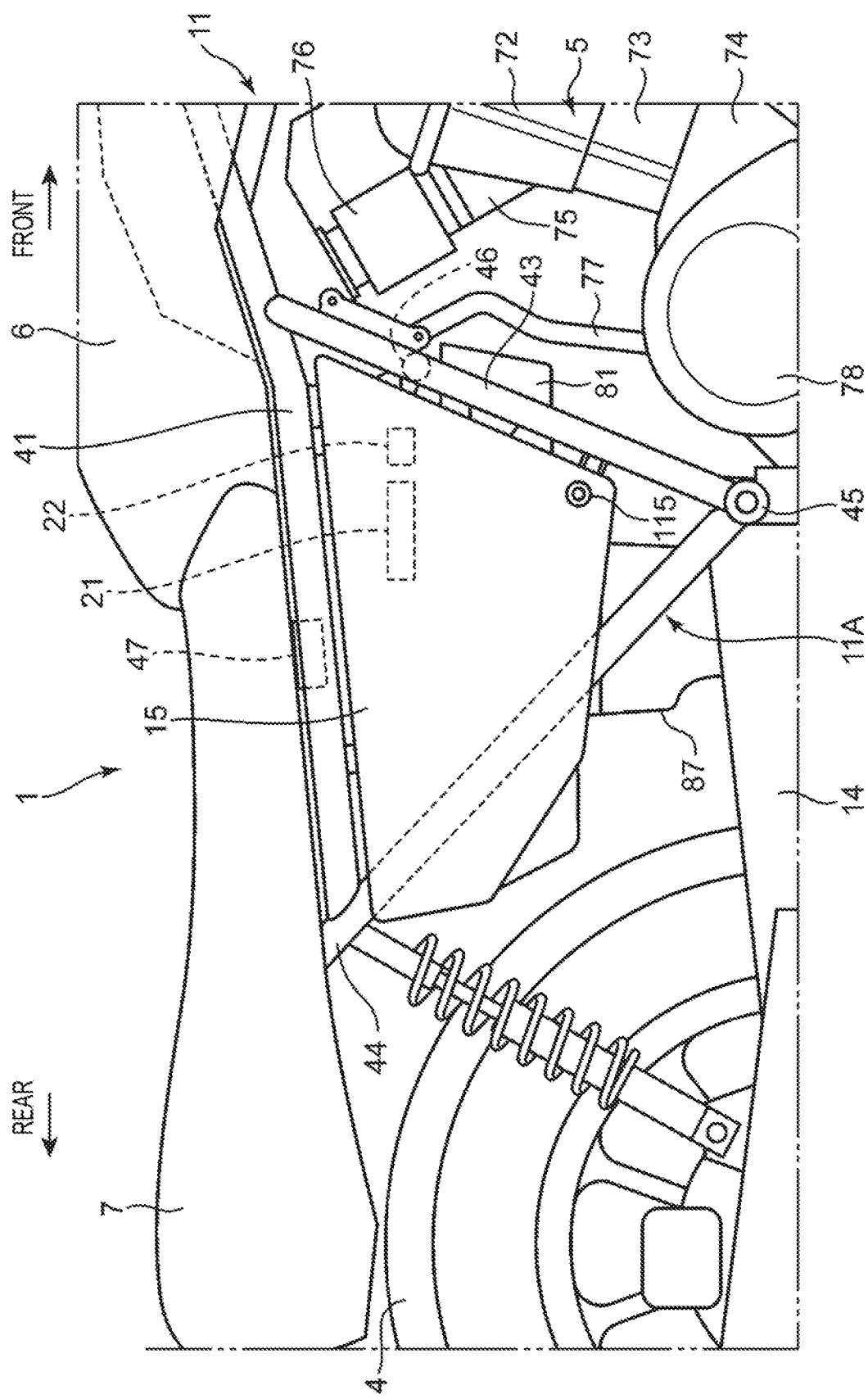
FIG. 4 is an enlarged side view of a front-rear central portion of the motorcycle.

FIG. 3 is an enlarged plan view showing a front upper portion (handle portion) of the motorcycle, and FIG. 4 is an enlarged side view showing a front-rear central portion of the motorcycle. As shown in FIGS. 1, 3, and 4, the vehicle body 1 includes a vehicle body frame 11, a head portion 12, a front fork 13, and swing arms 14. The vehicle body frame 11 is a frame structure that forms a framework of the vehicle body 1. The head portion 12 is a tubular member that holds the front fork 13 at a front end portion of the vehicle body frame 11. The front fork 13 is a member that connects the handle 8 and the front wheel 3. The swing arms 14 are members that connect the vehicle body frame 11 and the rear wheel 4.

The vehicle body frame 11 includes a main pipe 41, a lower pipe 42, a center pipe 43, a rear pipe 44, and a pivot shaft 45. The main pipe 41 is a pipe member extending from an upper portion of the head portion 12 while being inclined rearward and downward. The lower pipe 42 is a pipe member extending from a lower portion of the head portion 12 while being inclined rearward and downward, and is disposed so as to be inclined downward more than the main pipe 41. The center pipe 43 is a pipe member extending from an intermediate portion of the main pipe 41 while being inclined rearward and downward, and is disposed such that a distance from the main pipe 41 increases toward the rear. The rear pipe 44 is a pipe member extending from a lower end of the center pipe 43 while being inclined rearward and upward. A rear end portion (upper end portion) of the rear pipe 44 is coupled to a rear end portion of the main pipe 41. The pivot shaft 45 is a shaft member extending in a vehicle width direction, and is coupled to a front end portion of the rear pipe 44 (or a lower end portion of the center pipe 43).

Figure 7:
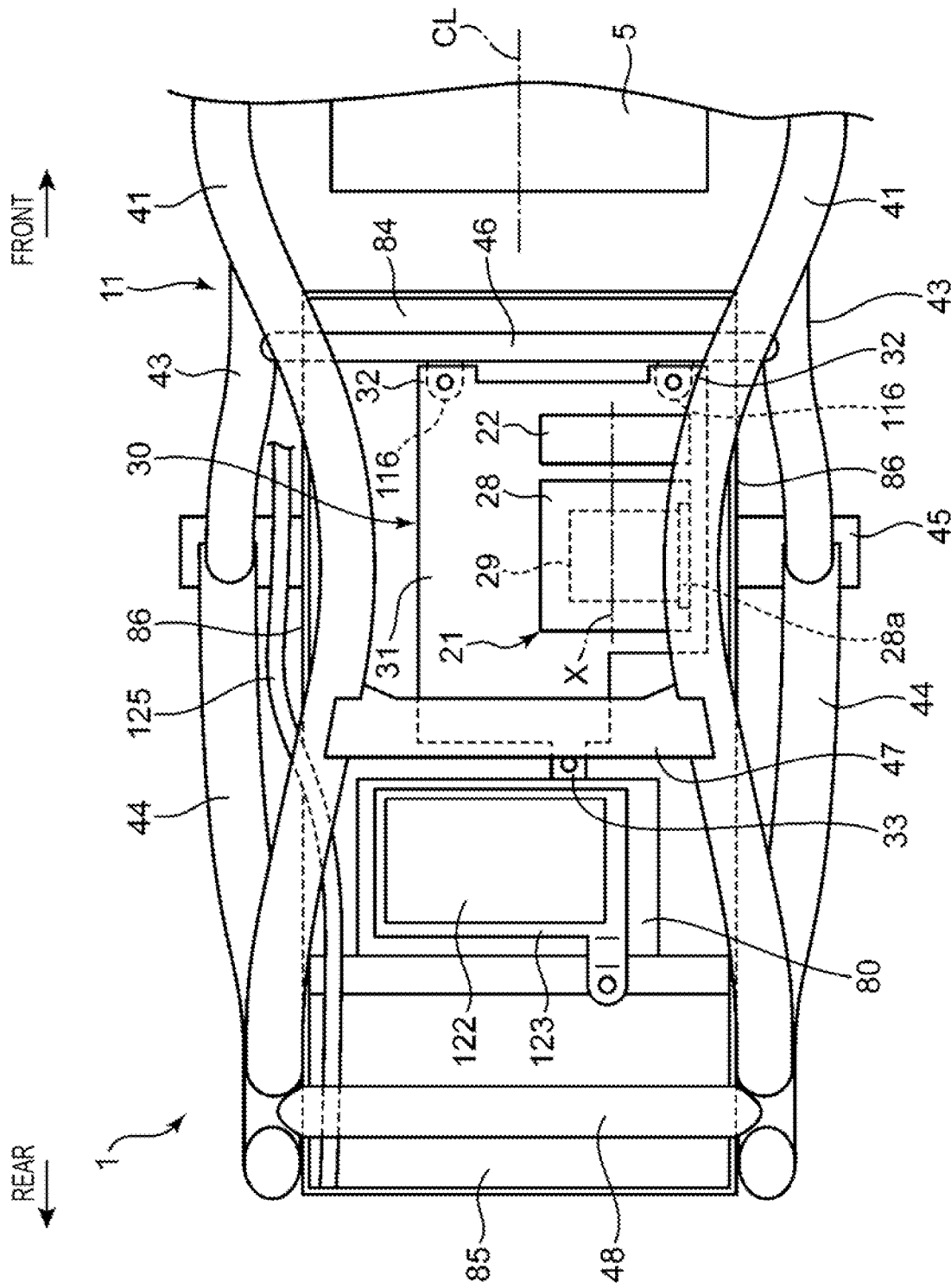
FIG. 7 is a plan view of a main part of the front-rear central portion of the motorcycle.

The vehicle body frame 11 has a bilaterally symmetrical structure. That is, as shown in FIG. 7 to be described later, the pipe groups 41 to 44 of the vehicle body frame 11 are provided not only on a right side of the vehicle body 1 shown in FIG. 1 but also on a left side of the vehicle body 1. In other words, the vehicle body frame 11 includes a pair of main pipes 41 and a pair of lower pipes 42 that extend from the head portion 12 while branching to the left and right, a pair of rear pipes 44 that are connected to rear end portions of the main pipes 41, and a pair of center pipes 43 that connect intermediate portions of the main pipes 41 and front end portions of the rear pipes 44.

As shown in FIGS. 1 and 4, side covers 15 are attached to side surfaces of the vehicle body 1. The side cover 15 is an exterior component attached to the vehicle body frame 11 so as to mainly cover a region below a front portion of the seat 7 in the side surface of the vehicle body 1. The side cover 15 is attached not only to a right side surface of the vehicle body 1 shown in FIGS. 1 and 4 but also to a left side surface of the vehicle body 1 in the same manner. The side cover 15 corresponds to a "cover member" in the present disclosure.

Specifically, the side cover 15 is attached in a manner of covering a triangular region in a side view surrounded by the main pipe 41, the center pipe 43, and the rear pipe 44. That is, the vehicle body frame 11 includes a side closed frame body 11A having a triangular shape in the side view, which is defined by a part of a rear side of the main pipe 41, the rear pipe 44, and the center pipe 43. The side cover 15 is a polygonal cover formed substantially along the pipes 41, 43, and 44 of the side closed frame body 11A, and is attached to the vehicle body frame 11 in a manner of mainly covering an inner region of the side closed frame body 11A.

Figure 5:
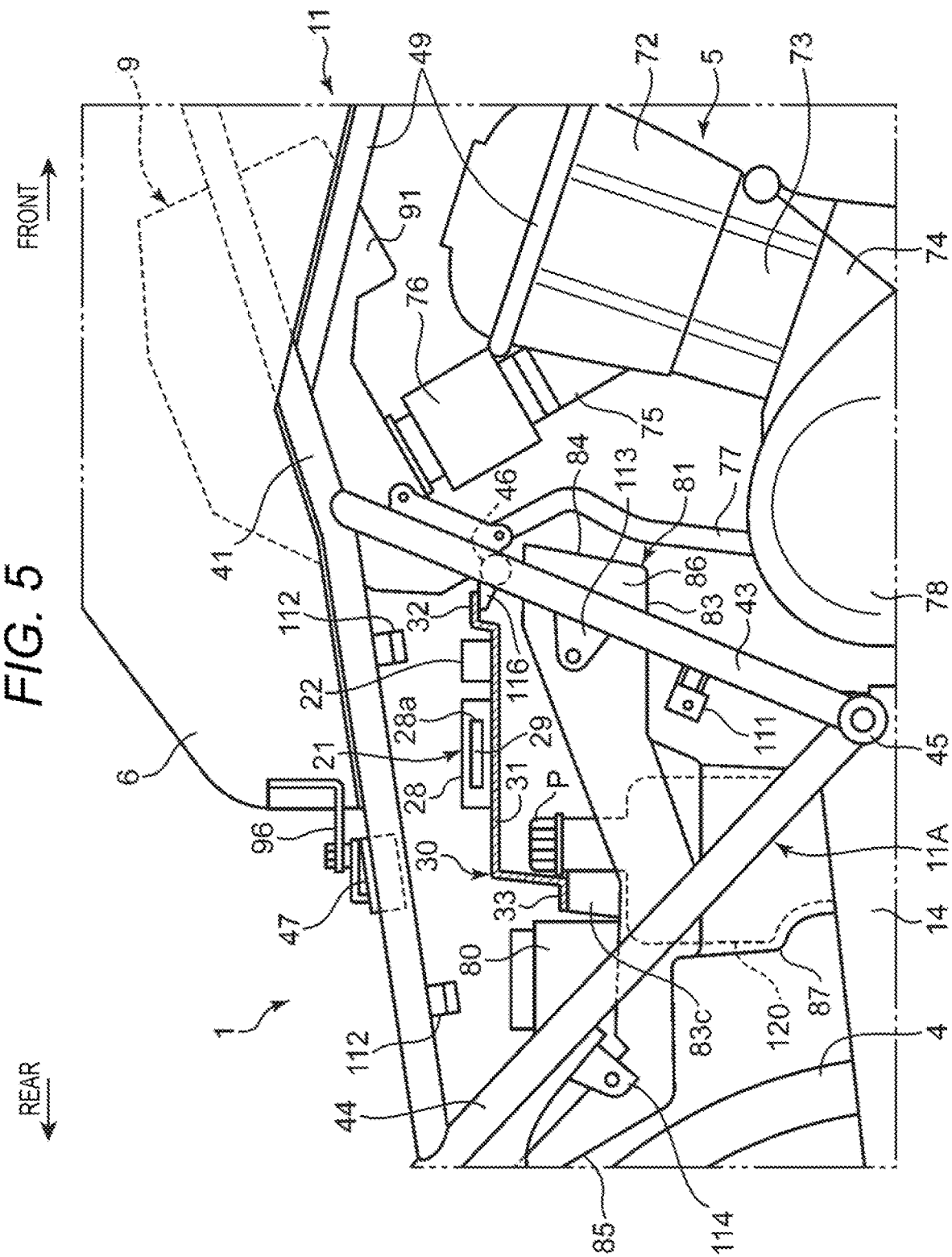
FIG. 5 is a view corresponding to FIG. 4, showing a state in which covers are removed from a vehicle body of the motorcycle.

FIG. 5 is a view corresponding to FIG. 4, showing a state in which covers including the side cover 15 and the seat 7 are removed from the vehicle body 1. As shown in FIG. 5, the side closed frame body 11A is provided with a fastening base 111 and a pair of fitting pieces 112 that hold the side cover 15. The fastening base 111 is a base to which a bolt 115 (FIG. 4) for fastening a lower portion of the side cover 15 is screwed, and protrudes rearward from a lower portion of the center pipe 43. The pair of fitting pieces 112 are protruding pieces into which an upper edge of the side cover 15 is inserted and fitted, and protrude downward from two portions of a rear portion of the main pipe 41. That is, the upper edge of the side cover 15 is fitted to the fitting pieces 112, and the lower portion of the side cover 15 is fastened to the fastening base 111 via the bolt 115, whereby the side cover 15 is detachably attached to the side closed frame body 11A.

As shown in FIGS. 1 and 4, a rear fender 18 is attached to a rear portion of the vehicle body 1. The rear fender 18 protrudes rearward from the seat 7 in a manner of covering an upper side and a rear side of the rear wheel 4.

Figure 6:
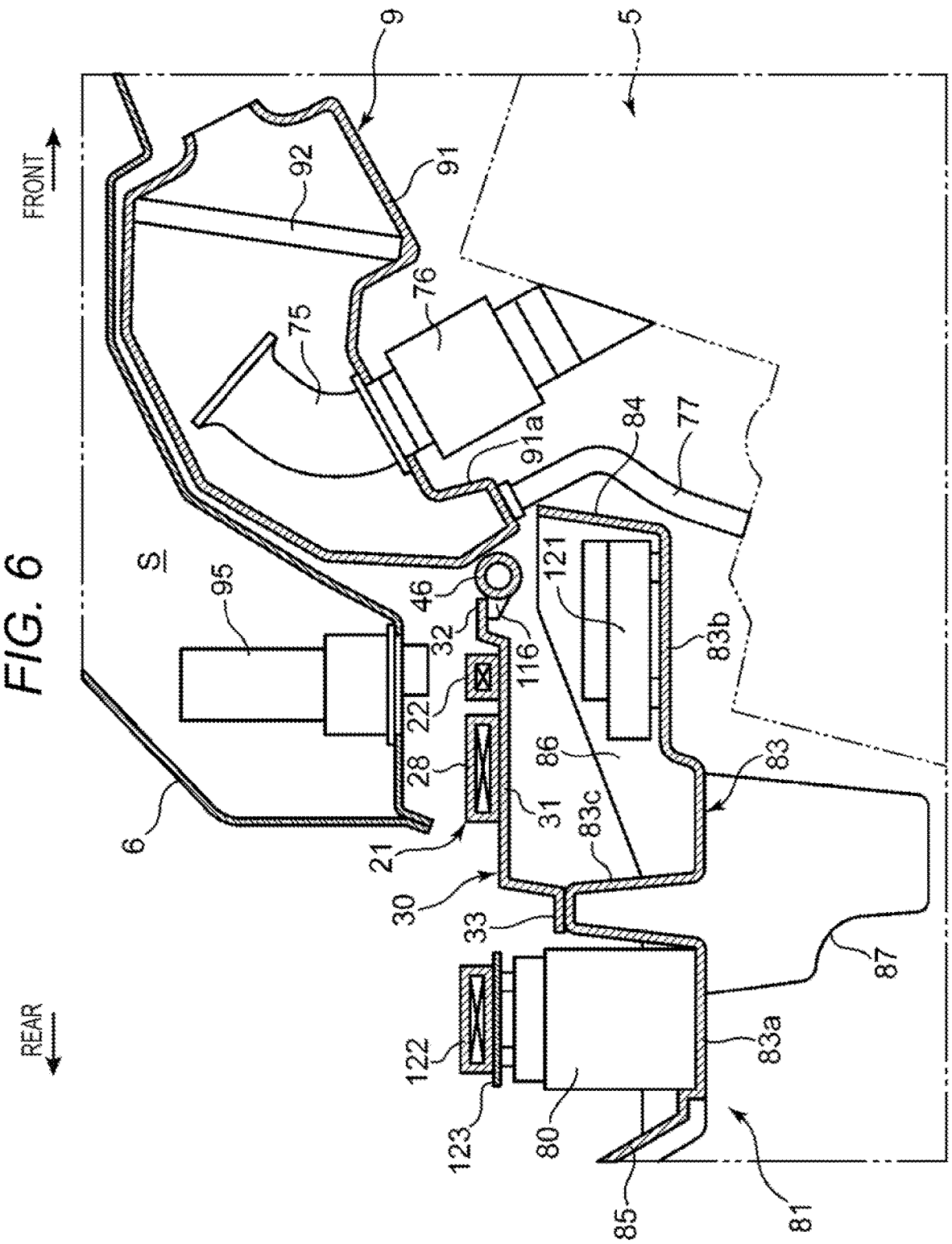
FIG. 6 is a side sectional view of the front-rear central portion of the motorcycle.

FIG. 6 is a side sectional view of the front-rear central portion of the motorcycle, and FIG. 7 is a plan view of a main part of the front-rear central portion of the motorcycle. As shown in FIGS. 5 to 7, the vehicle body frame 11 further includes a center cross pipe 46, an upper cross member 47, and a rear cross pipe 48 (FIG. 7) as reinforcing members extending in the vehicle width direction. The center cross pipe 46 is a pipe member that connects upper portions of the left and right center pipes 43 to each other. The upper cross member 47 is a member that connects rear portions of the left and right main pipes 41 to each other. The rear cross pipe 48 is a pipe member that connects rear end portions of the left and right rear pipes 44 to each other.

As shown in FIGS. 1, 4, and 5, the swing arms 14 are arms that connect the vehicle body frame 11 and the rear wheel 4 and extend in a front-rear direction. A front end portion of the swing arm 14 is connected to the pivot shaft 45, so that the swing arm 14 can swing in an upper-lower direction about the pivot shaft 45. The rear wheel 4 is pivotally supported by a rear end portion of the swing arm 14. That is, the swing arm 14 supports the rear wheel 4 so as to be swingable in an upper-lower direction with respect to the vehicle body frame 11.

As shown in FIGS. 1 and 3, the front fork 13 includes a pair of left and right fork tubes 51, an upper bracket 52, an under bracket 53, and a stem shaft 54. The pair of fork tubes 51 are tubular members each having a suspension function, and extend obliquely downward from the handle 8 toward the front wheel 3. The front wheel 3 is pivotally supported by lower end portions of the fork tubes 51 between the pair of fork tubes 51. The upper bracket 52 is a bracket that connects upper end portions of the pair of fork tubes 51 to each other. The under bracket 53 is a bracket that connects the pair of fork tubes 51 to each other at a position lower than the upper bracket 52. The stem shaft 54 is a shaft that connects the upper bracket 52 and the under bracket 53 between the pair of fork tubes 51. The stem shaft 54 is inserted into the head portion 12 in a manner of being rotatable about an axis thereof. In other words, the front fork 13 is rotatably supported by the head portion 12 via the stem shaft 54.

The handle 8 includes a pair of left and right handle posts 61 and a handlebar 62. The pair of handle posts 61 are members that protrude upward from two portions on the left and right of the upper bracket 52, and are fixed to an upper surface of the upper bracket 52. The handlebar 62 is a bar member extending in a left-right direction (vehicle width direction), and is held by the pair of handle posts 61 in an inserted state. Accelerator grips 63, brake levers 64, and clutch levers 65 are attached to both side portions of the handlebar 62.

The engine 5 is, for example, a four-cycle internal combustion engine. As shown in FIGS. 4 and 5, the engine 5 includes a cylinder head 72, a cylinder block 73, and a crankcase 74. The cylinder head 72 and the cylinder block 73 are housings that enclose a space (cylinder) in which fuel supplied from the fuel tank 6 is combusted. The crankcase 74 is a case that rotatably houses a crankshaft, which is an output shaft of the engine 5. Rotation of the crankshaft, that is, output rotation of the engine 5 is transmitted to the rear wheel 4 via a transmission 78 and a chain 79 (FIG. 1). The engine 5 is supported by the vehicle body frame 11 by fixing the cylinder head 72 and the like between a front portion of the main pipe 41 and the lower pipe 42.

The fuel tank 6 has therein a storage space S (FIG. 6) for storing fuel to be supplied to the engine 5. The fuel tank 6 is supported by the vehicle body frame 11 at a front upper portion of the vehicle body 1 above the engine 5. Specifically, a rear end portion of the fuel tank 6 is fastened and fixed to the upper cross member 47 via a bracket 96 (FIG. 5). A front end portion of the fuel tank 6 is fastened and fixed to a front end portion of the main pipe 41 via a bracket (not shown). A fuel pump 95 (FIG. 6) is attached inside the fuel tank 6. The fuel pump 95 pressurizes to feed the fuel stored in the storage space S to the engine 5 through a fuel supply pipe (not shown).

As shown in FIGS. 5 and 6, an air cleaner 9 is disposed between the engine 5 and the fuel tank 6. The air cleaner 9 removes a foreign matter in intake air introduced into the engine 5, and includes a cleaner case 91 and a filter 92 provided inside the cleaner case 91. An intake pipe 75 extending from the cylinder head 72 is introduced into the cleaner case 91. That is, the intake pipe 75 allows communication between an inside of the cleaner case 91 and the cylinder so that the intake air filtered by the filter 92 can be introduced into a cylinder of the engine 5. A throttle valve 76 for adjusting a flow rate of the intake air is disposed in the middle of the intake pipe 75.

The air cleaner 9 and the crankcase 74 are connected to each other by a blowby hose 77. The blowby hose 77 is a hose for recirculating un-combusted gas inside the crankcase 74 to the intake pipe 75. The cleaner case 91 of the air cleaner 9 includes an extension portion 91a (FIG. 6) protruding downward from a rear end portion thereof, and an upper end (downstream end) of the blowby hose 77 is connected to the extension portion 91a.

The seat 7 is attached to an upper surface of the rear portion of the vehicle body 1 immediately behind the fuel tank 6. Specifically, the seat 7 is attached to the vehicle body frame 11 (rear portion and the like of the main pipe 41) so as to cover a region including the upper side of the rear wheel 4 from above. Fixing of the seat 7 to the vehicle body frame 11 can be released by unlocking a key cylinder (not shown) provided on the side surface of the vehicle body 1. That is, the seat 7 is detachably attached to the upper surface of the rear portion of the vehicle body 1.

A side stand 19 is attached to a lower portion on the left side of the vehicle body 1, which corresponds to a back side of the plane of FIG. 1. The side stand 19 is a stand that is used when parking the motorcycle, and is displaceable between a use state (FIG. 1) in which the side stand 19 extends downward from a lower left portion of the vehicle body 1 and a storage state in which the side stand 19 is raised rearward with respect to the use state. The side stand 19 displaced to the use state supports the vehicle body in a state in which the vehicle body is inclined to the left side.

As shown in FIGS. 5 to 7, a battery 80 is disposed between the engine 5 and the rear wheel 4. The battery 80 is a capacitor that stores electric power supplied from a generator (not shown) that generates the electric power by the driving force of the engine 5. The battery 80 is supported by a battery case 81 fixed to the vehicle body frame 11 between the engine 5 and the rear wheel 4.

The battery case 81 includes a bottom wall 83, a front wall 84, a rear wall 85, a pair of left and right side walls 86, and a bottom container portion 87. The bottom wall 83 is a wall portion that supports the battery 80 from below. Specifically, as shown in FIG. 6, the bottom wall 83 includes a battery mounting portion 83a on which the battery 80 is mounted, an extension portion 83b extending forward from the battery mounting portion 83a, and a protruding portion 83c protruding upward between the battery mounting portion 83a and the extension portion 83b. The front wall 84 is a wall portion that extends upward from a front end of the bottom wall 83. The rear wall 85 is a wall portion that extends from a rear end of the bottom wall 83 while being inclined upward and rearward. The pair of side walls 86 are wall portions that protrude upward from left and right side edges of the bottom wall 83, and extend in the front-rear direction from both end portions of the front wall 84 to both end portions of the rear wall 85. The bottom container portion 87 protrudes downward from the bottom wall 83 and is formed in a bottomed cylindrical shape.

The battery case 81 is fixed to the vehicle body frame 11 via first support pieces 113 and second support pieces 114 shown in FIG. 5. The first support piece 113 protrudes rearward from an intermediate portion of the center pipe 43 in the upper-lower direction, and the second support piece 114 protrudes downward from a rear portion of the rear pipe 44. The battery case 81 is fixed to the vehicle body frame 11 between the engine 5 and the rear wheel 4 by fastening the side walls 86 of the battery case 81 to the first and second support pieces 113 and 114 via bolts or the like.

As mainly shown in FIG. 6, the battery case 81 is disposed such that an upper end portion of the front wall 84 is close to a lower end of a rear portion of the air cleaner 9. That is, the upper end portion of the front wall 84 is close to the extension portion 91a of the cleaner case 91 corresponding to the lower end of the rear portion of the air cleaner 9. The front wall 84 and the extension portion 91a that are close to each other in this way play a role as a partition wall that partitions the engine 5 and a recorder main body 21 (or a power supply unit 22), which will be described later. Although not illustrated in detail, a seal member such as a rubber sheet that closes a gap between the front wall 84 and the extension portion 91a may be added between the front wall 84 and the extension portion 91a.

A reservoir tank 120 (FIG. 5) is housed in the bottom container portion 87. The reservoir tank 120 is a tank in which cooling water used for cooling the engine 5 is stored. The reservoir tank 120 includes a cap P at an upper end portion thereof. The cap P is a lid that closes a replenishing port for replenishing the cooling water.

A control unit 121 (FIG. 6) is mounted on the extension portion 83b of the bottom wall 83. The control unit 121 is a device that controls the engine 5, and includes electronic devices such as a processor and a memory, and a power supply circuit.

As shown in FIGS. 6 and 7, an ETC on-board device 122 is disposed above the battery 80. The ETC on-board device 122 is a device into which a card used in an electronic toll collection system (ETC) that automatically pays a toll of a toll road is inserted. The ETC on-board device 122 is fixed to an upper surface of a bracket 123 attached above the battery 80 using an appropriate fixing method. An operation of inserting and removing the ETC card into and from the ETC on-board device 122 can be performed in a state in which the seat 7 is removed.

Details of Drive Recorder

Next, the drive recorder 2 shown in FIG. 2 will be described in detail. The drive recorder 2 includes the recorder main body 21, the power supply unit 22, a front camera 23, a rear camera 24, a GPS antenna 25, and an operation unit 26. The recorder main body 21 is a device that stores various types of information including videos captured by the front camera 23 and the rear camera 24. The power supply unit 22 is a device that supplies electric power to the recorder main body 21. The front camera 23 is a camera that captures the video in front of the vehicle body 1 as a moving image. The rear camera 24 is a camera that captures the video behind the vehicle body 1 as a moving image. The GPS antenna 25 is an antenna that receives a signal indicating position information transmitted from a GPS satellite. The operation unit 26 is a device that receives an operation performed by the occupant on the drive recorder 2. The recorder main body 21 is electrically connected to the power supply unit 22, the front camera 23, the rear camera 24, the GPS antenna 25, and the operation unit 26 via cables C1 to C5.

As shown in FIG. 1, the front camera 23 is attached to a front end portion of the vehicle body 1, specifically, the under bracket 53 of the front fork 13. The front camera 23 is attached to the under bracket 53 such that the front of the vehicle body 1 can be captured with a field of view (lens portion) facing forward.

The rear camera 24 is attached to a rear end portion of the vehicle body, specifically, a rear end portion of the rear fender 18. The rear camera 24 is attached to the rear fender 18 such that the rear of the vehicle body 1 can be captured with a field of view (lens portion) facing rearward.

The GPS antenna 25 is attached to the rear fender 18 in the vicinity of the rear camera 24.

As shown in FIGS. 5 to 7, the recorder main body 21 includes a housing 28 and a memory card 29. The housing 28 is a box-shaped member that holds the memory card 29 therein, and has a slot 28a for inserting and removing the memory card 29 on one surface thereof. The memory card 29 is a detachable storage medium such as an SD card, and can be attached to an inside of the housing 28 or removed from the housing 28 through the slot 28a. In other words, the slot 28a is an opening for accessing the memory card 29 (storage medium), and corresponds to an "access portion" in the present disclosure.

The housing 28 incorporates a processing unit 27 (FIG. 2) that controls storage processing in the memory card 29. The processing unit 27 stores, in the memory card 29, the videos captured by the front camera 23 and the rear camera 24 for a predetermined recording time while updating the videos. For example, the processing unit 27 causes the memory card 29 to store latest videos captured by the cameras 23 and 24 in a form of overwriting erased data while sequentially erasing videos older than the recording time from the memory card 29. The processing unit 27 stores data of the position information input from the GPS antenna 25 in the memory card 29 in association with the captured videos.

As shown in FIG. 3, the operation unit 26 is attached to the handle 8. Specifically, the operation unit 26 is fixed to an upper surface of a bracket 67 attached to one of the left and right handle posts 61 (here, the left handle post 61).

The operation unit 26 includes an imaging switch 26a and a plurality of indicators 26b. The imaging switch 26a is a switch that is turned on at a timing at which the occupant wants to store a video. That is, when the imaging switch 26a is turned on by the occupant, update of the video for a predetermined period including a time point of the turn-on operation is prohibited in the recorder main body 21. Accordingly, the video that the occupant wants to store can be left in the memory card 29 without being updated. The indicator 26b emits light in a color corresponding to an operation mode of the drive recorder 2, thereby notifying the occupant that, for example, the front camera 23 and the rear camera 24 are currently capturing the videos.

Layout of Recorder Main Body, etc.

Next, layouts of the recorder main body 21 and the power supply unit 22 will be described in detail. As shown in FIGS. 5 and 7, the recorder main body 21 and the power supply unit 22 are disposed between the engine 5 and the rear wheel 4 in the side view, and are disposed at positions overlapping with the engine 5 in a front view.

The recorder main body 21 and the power supply unit 22 are mounted on a tray 30 shown in FIGS. 5 to 7. The tray 30 includes a flat plate-shaped tray main body 31 on which the recorder main body 21 and the power supply unit 22 are placed, a pair of front fixing pieces 32 protruding forward and upward from two portions on the left and right of a front end of the tray main body 31, and a rear fixing piece 33 protruding rearward and downward from a rear end of the tray main body 31. The pair of front fixing pieces 32 are fastened to a pair of protruding pieces 116 joined to two portions on the left and right of the center cross pipe 46, respectively, using bolts or the like. The rear fixing piece 33 is fastened to the protruding portion 83c of the battery case 8 1 using a bolt or the like. That is, the tray 30 is fixed to the center cross pipe 46 and the battery case 81 by fastening the front fixing pieces 32 to the protruding pieces 116 and fastening the rear fixing piece 33 to the protruding portion 83c.

The tray 30 fixed in the above-described manner is disposed above the battery case 81 in a manner of being provided inside the side closed frame body 11A (FIG. 5) in the side view. The recorder main body 21 and the power supply unit 22 attached to the tray 30 are also provided inside the side closed frame body 11A in the side view. Here, as described above, the side closed frame body 11A is a frame body having a triangular shape in the side view defined by the main pipe 41, the rear pipe 44, and the center pipe 43. The recorder main body 21 and the power supply unit 22 inside the side closed frame body 11A do not overlap with any of the pipes 41, 43, and 44 in the side view.

Here, the side cover 15 is attached to the side closed frame body 11A in a manner of covering an inner region of the side closed frame body 11A. Therefore, the recorder main body 21 and the power supply unit 22 inside the side closed frame body 11A are obscured by the side cover 15 in a normal state in which the side cover 15 is attached (see FIG. 4).

The recorder main body 21 and the power supply unit 22 are fixed to an upper surface of the tray main body 31 using a fixing unit such as an adhesive tape. Specifically, as shown in FIG. 7, the recorder main body 21 and the power supply unit 22 are fixed at a right side in the tray main body 31. That is, when a line bisecting the housing 28 of the recorder main body 21 in the vehicle width direction is defined as a center line X, the recorder main body 21 is disposed such that the center line X is offset to the right side with respect to a vehicle width center CL of the vehicle body 1. Here, as described above, the side stand 19 (FIG. 1) is attached to the left side of the vehicle body 1. Therefore, the center line X of the recorder main body 21 is located on a side opposite to the side stand 19 across the vehicle width center CL. In other words, the recorder main body 21 is disposed such that a center portion of the recorder main body 21 is offset to a side opposite to the side stand 19 with respect to the vehicle width center CL of the vehicle body 1. Similarly, the power supply unit 22 is also disposed such that a center portion thereof is offset to a side (right side) opposite to the side stand 19 with respect to the vehicle width center CL of the vehicle body 1.

As shown in FIGS. 5 and 7, the slot 28a for inserting and removing the memory card 29 is formed on a right side surface of the housing 28. In other words, the recorder main body 21 is disposed such that the slot 28a opens on the side (right side) opposite to the side stand 19 in the vehicle width direction. However, in the normal state in which the side cover 15 is mounted, the slot 28a is obscured by the side cover 15.

As shown in FIG. 7, a main harness 125 is wired on a left side portion of the upper portion of the vehicle body 1 so as to extend in the front-rear direction along the main pipe 41. The main harness 125 is a cable in which a signal line connected to the control unit 121 (FIG. 6) and a power supply line connected to the battery 80 are bundled. A wiring position of the main harness 125 corresponds to an opposite side of the recorder main body 21 and the power supply unit 22 disposed on the right side of the vehicle body 1. In other words, the recorder main body 21 and the power supply unit 22 are disposed on an opposite side of the main harness 125 in the vehicle width direction.

Figure 8:
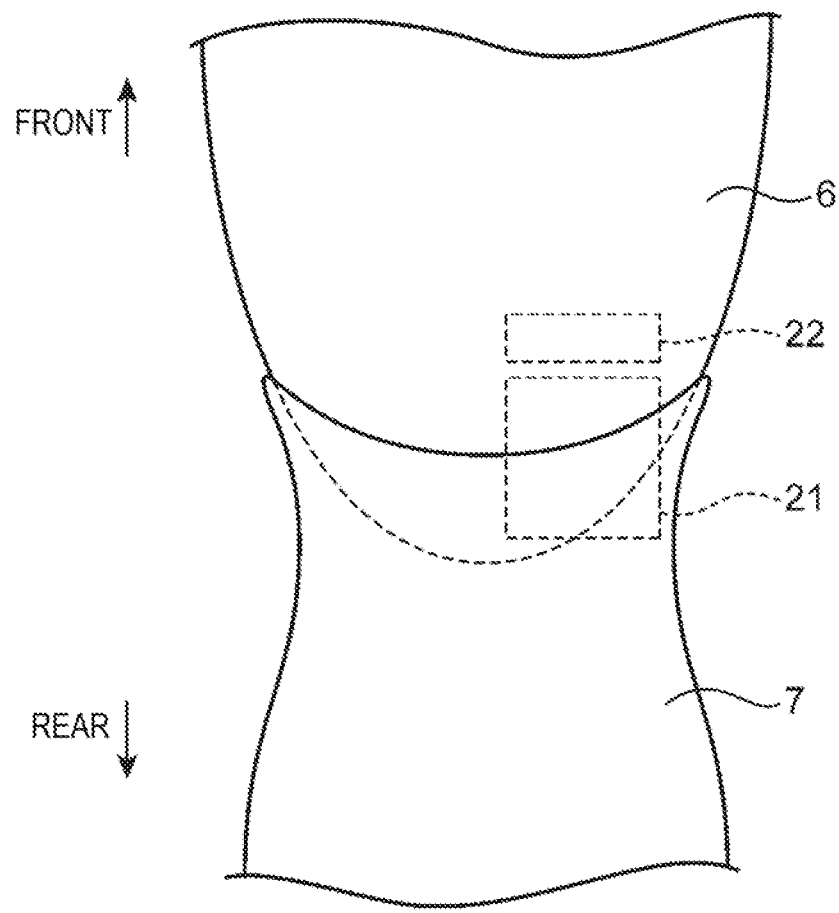
FIG. 8 is a simplified plan view of the front-rear central portion of the motorcycle.

FIG. 8 is a plan view showing a positional relationship between the recorder main body 21 and the power supply unit 22 with respect to the fuel tank 6 and the seat 7. As shown in FIGS. 8 and 4, the recorder main body 21 is disposed below the fuel tank 6 and the seat 7. Specifically, the recorder main body 21 is disposed in a region extending over a rear portion of the fuel tank 6 and a front portion of the seat 7, and is disposed in a manner of overlapping with both the fuel tank 6 and the seat 7 in the plan view shown in FIG. 8. In other words, the fuel tank 6, the seat 7, and the recorder main body 21 have such a positional relationship that at least a front portion of the recorder main body 21 overlaps with the fuel tank 6 and at least a rear portion of the recorder main body 21 overlaps with the seat 7 in the plan view. On the other hand, the power supply unit 22 is disposed below the fuel tank 6 in a manner of completely overlapping with the fuel tank 6.

Operation and Effect

As described above, in the present embodiment, the side cover 15 is detachably attached to the side closed frame body 11A on a side surface of the vehicle body 1, and the recorder main body 21 of the drive recorder 2 is disposed at a position corresponding to an inside of the side closed frame body 11A in the side view. According to such a configuration, there is an advantage that the recorder main body 21 can be appropriately protected while ensuring accessibility to the memory card 29 in the recorder main body 21.

That is, in the present embodiment, since the recorder main body 21 is covered from a lateral direction by the side cover 15 at the normal state in which the side cover 15 is mounted, the recorder main body 21 can be obscured by the side cover 15 so as not to be visually recognized from the lateral direction. Accordingly, it is possible to prevent a situation in which the memory card 29 in the recorder main body 21 is illegally taken out through the slot 28a, and it is possible to reduce a possibility that the foreign matter or the like collides with the recorder main body 21 during traveling.

On the other hand, extraction of video data (imaging information) from the memory card 29, which is performed by the occupant, can be easily performed in a state in which the side cover 15 is removed. That is, the side cover 15 can be removed from the side closed frame body 11A only by performing an operation of removing the bolt 115 (FIG. 4) for fixing the side cover 15. When the side cover 15 is removed, since the slot 28a of the recorder main body 21 is exposed to a position accessible through an inner opening of the side closed frame body 11A, the memory card 29 can be easily taken out through the exposed slot 28a, and the video data can be easily extracted from the taken-out memory card 29.

Here, in the present embodiment, the side closed frame body 11A in which the recorder main body 21 is disposed is assembled such that the main pipe 41, the center pipe 43, and the rear pipe 44 are closed in a triangular shape in the side view. In the present embodiment, since the recorder main body 21 is disposed in a robust place surrounded by the three pipes 41, 43, and 44 in this way, the recorder main body 21 can be appropriately protected. Since the recorder main body 21 is disposed inside the side closed frame body 11A which does not overlap with any of the pipes 41, 43, and 44 in the side view, the pipes 41, 43, and 44 do not interfere with access to the memory card 29 in the recorder main body 21, and the memory card 29 can be easily inserted and removed.

In the present embodiment, the recorder main body 21 is disposed at a position between the engine 5 and the rear wheel 4 and overlapping with the engine 5 in the front view. According to such a configuration, the recorder main body 21 can be efficiently disposed using a dead space that is likely to be formed between the engine 5 and the rear wheel 4. Since the recorder main body 21 can be disposed rearward away from the engine 5, it is possible to reduce an influence of heat that may extend from the engine 5 to the recorder main body 21.

In particular, in the present embodiment, the front wall 84 of the battery case 81 and the extension portion 91a of the air cleaner 9 (cleaner case 91) are disposed between the recorder main body 21 and the engine 5 in a state of being close to each other in the upper-lower direction (see FIG. 6), and thus by using the front wall 84 and the extension portion 91a as partition walls, the influence of heat from the engine 5 can be further reduced.

Further, in the present embodiment, the recorder main body 21 is disposed below the seat 7 and the fuel tank 6 and at a position overlapping with both of the seat 7 and the fuel tank 6 in the plan view (see FIGS. 4 and 8). According to such a configuration, the recorder main body 21 can be obscured with the seat 7 and the fuel tank 6 from above, and the recorder main body 21 can be appropriately protected.

Further, in the present embodiment, the tray 30 is provided so as to bridge the center cross pipe 46 of the vehicle body frame 11 and the protruding portion 83c of the battery case 81, and the recorder main body 21 is fixed to an upper surface of the tray 30 (see FIGS. 5 and 6). According to such a configuration, the recorder main body 21 can be stably fixed to the upper surface of the tray 30 having sufficient support rigidity.

Further, in the present embodiment, the recorder main body 21 is disposed such that the slot 28a is opened on the right side of the vehicle body 1 which is the side opposite to the side stand 19 (see FIGS. 5 and 7). According to such a configuration, when the vehicle body 1 is parked by the side stand 19 in a posture in which the vehicle body 1 is inclined to the left side, since the slot 28a faces obliquely upward, it is possible to facilitate insertion and removal of the memory card 29 through the slot 28a.

In the present embodiment, the recorder main body 21 is disposed such that a center portion thereof is located at a position offset to a right side with respect to the vehicle width center CL of the vehicle body 1 (see FIG. 7). According to such a configuration, it is possible to bring the slot 28a close to the same side as the occupant who tries to take out the memory card 29, and it is possible to further facilitate the insertion and removal of the memory card 29 described above.

In the present embodiment, the main harness 125 is wired along a left side portion of the vehicle body 1 opposite to the recorder main body 21 (see FIG. 7). According to such a configuration, since a distance between the recorder main body 21 and the main harness 125 is increased, it is possible to reduce an influence of an electromagnetic noise that may be generated from the main harness 125 on the recorder main body 21.

Modification

Figure 9:
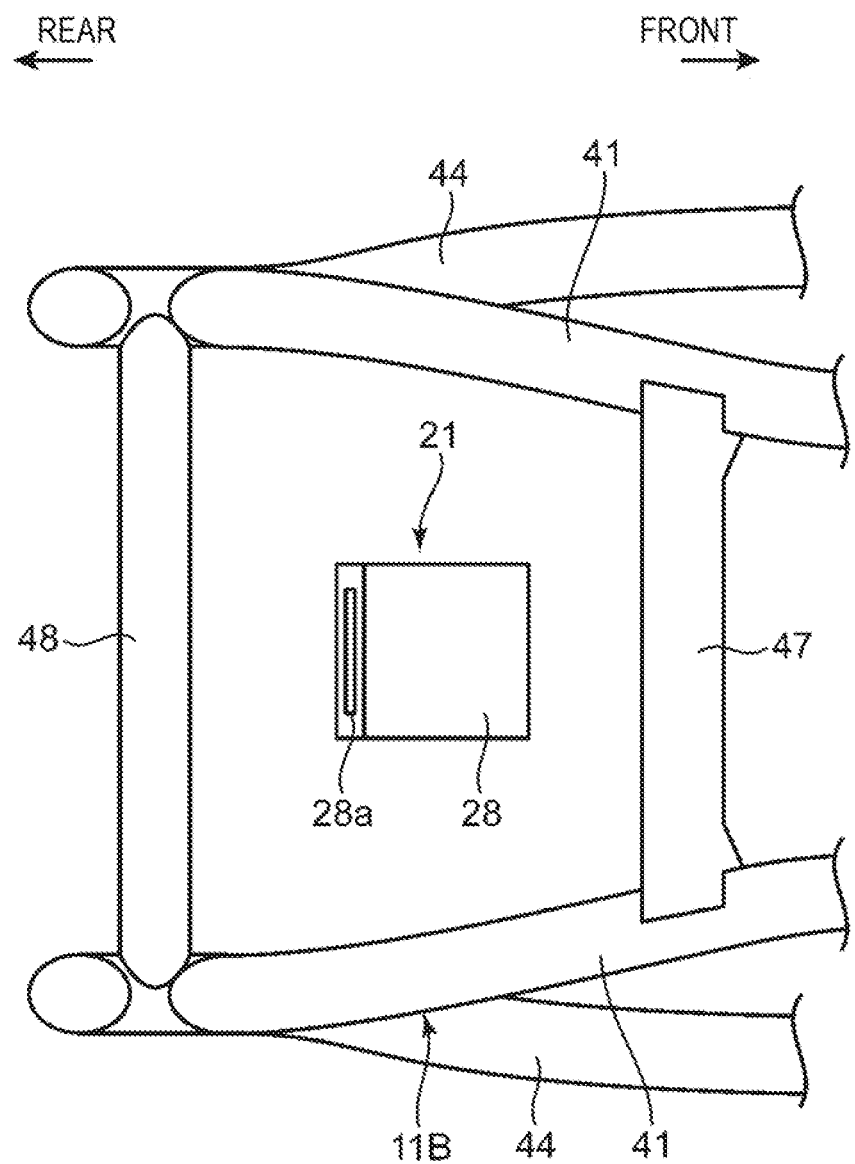
FIG. 9 is a plan view illustrating a modification of the embodiment.

In the above-described embodiment, the side closed frame body 11A having the triangular shape is formed on the side surface of the vehicle body 1, and the recorder main body 21 is disposed at a position surrounded by the side closed frame body 11A in the side view, but a frame body surrounding the recorder main body 21 is not limited to the side closed frame body 11A. FIG. 9 is a plan view showing an example in which the frame body surrounding the recorder main body 21 is changed. In the modification shown in FIG. 9, the recorder main body 21 is disposed inside an upper closed frame body 11B having a substantially rectangular shape in the plan view. The upper closed frame body 11B in this case is a frame body formed in a manner of being closed in a rectangular shape behind the fuel tank 6, and is formed by rear portions of the pair of main pipes 41, the upper cross member 47, and the rear cross pipe 48. The recorder main body 21 is disposed at a position surrounded by the elements 41, 47, and 48 in the plan view. The recorder main body 21 is disposed in an inclined posture such that the slot 28a is opened upward and rearward. The recorder main body 21 disposed inside such an upper closed frame body 11B is covered from above by the seat 7 (FIG. 4) in a normal state in which the seat 7 is mounted. According to the modification shown in FIG. 9, the recorder main body 21 can be protected by the seat 7 (exterior component) in the normal state, and the memory card 29 can be easily inserted and removed through the slot 28a exposed in a state in which the seat 7 is removed. In the modification of FIG. 9, the seat 7 that covers the recorder main body 21 from above corresponds to a "cover member" in the present disclosure.

In the above-described embodiment, the recorder main body 21 is disposed such that the entire recorder main body 21 is inside the side closed frame body 11A in the side view, but it is sufficient that at least the slot 28a which is an access portion to the memory card 29 is inside the side closed frame body 11A, and it is not necessary that the entire recorder main body 21 is inside the side closed frame body 11A. In other words, a portion of the recorder main body 21 other than the slot 28a may overlap with any one of the elements (main pipe 41, center pipe 43, and rear pipe 44) constituting the side closed frame body 11A in the side view.

In the above-described embodiment, the recorder main body 21 including the housing 28 and the memory card 29 attachable to and detachable from the housing 28 is prepared, and the videos captured by the front and rear cameras 23 and 24 are stored in the memory card 29, but a recorder main body is not limited to the one including such a detachable storage medium. For example, the recorder main body may include a hard disk, which is a fixed storage medium. In this case, a cable connector that extracts video data from the hard disk may be provided in a housing of the recorder main body. Accordingly, the occupant can extract the video data from the hard disk by, for example, inserting an end of a cable, the other end of which is connected to an information device such as a smartphone or a personal computer, into the cable connector. The cable connector in this case is a port for accessing the storage medium, and corresponds to an "access portion" in the present disclosure.

In the above embodiment, the recorder main body 21 incorporating the memory card 29 and the power supply unit 22 that supplies electric power to the recorder main body 21 are configured separately, but both may be integrated. In other words, the recorder main body in the present disclosure may incorporate a storage medium, and may be separated from a power supply portion as in the above-described embodiment, or may be integrated with the power supply portion.

In the above-described embodiment, the front camera 23 that captures the front of the vehicle body 1 and the rear camera 24 that captures the rear of the vehicle body 1 are attached to the vehicle body 1, but one of these cameras may be omitted. Alternatively, a camera that captures an image in any direction (for example, a lateral direction of the vehicle body 1) other than a forward direction and a rearward direction of the vehicle body 1 may be attached.

In the above-described embodiment, the videos of the surroundings of the vehicle body 1 are captured as moving images using the cameras (front camera 23 and rear camera 24), but the videos captured by the cameras are not limited to the moving images, and may be, for example, a fragmentary frame still image. In other words, the information stored in the storage medium in the present disclosure may be any imaging information captured by the camera, and may be any information of a moving image and a still image.

In the above embodiment, an example in which the present disclosure is applied to a motorcycle that is a type of saddle-ride type vehicle has been described, but the present disclosure is also applicable to other saddle-ride type vehicles such as three-wheeled vehicles and four-wheeled buggies.

Summary

The above embodiment and the modification of the embodiment are summarized as follows.

A saddle-ride type vehicle includes: a vehicle body; a camera attached to the vehicle body; a recorder main body including a storage medium that stores imaging information captured by the camera; and a cover member detachably attached to the vehicle body as an exterior component and covering at least an access portion to the storage medium in the recorder main body at a time of attachment.

In this aspect, in a normal state in which the cover member is attached, the access portion to the storage medium in the recorder main body can be obscured by the cover member. Accordingly, it is possible to prevent a situation in which an illegal operation is performed on the storage medium through the access portion, and it is possible to reduce a possibility that a foreign matter or the like collides with the recorder main body during traveling.

On the other hand, extraction of the imaging information from the storage medium, which is performed by the occupant, can be easily performed in a state in which the cover member is removed. That is, by removing the cover member and exposing the access portion to the storage medium, it is possible to easily access the storage medium through the exposed access portion and extract the imaging information.

The recorder main body may include a housing and a memory card as the storage medium removably attached to an inside of the housing. In this case, the access portion may be a slot formed in the housing for insertion and removal of the memory card.

In this aspect, the memory card can be easily taken out from the housing through the slot exposed by removing the cover member, and the imaging information can be easily extracted from the taken-out memory card.

The vehicle body may include a side closed frame body assembled so as to have a specific closed shape in the side view. In this case, it is preferable that the cover member is a side cover detachably attached to the side closed frame body, and the recorder main body is disposed at a position where the access portion is provided inside the side closed frame body in the side view.

In this aspect, since the recorder main body is disposed in a robust place surrounded by the side closed frame body, it is possible to appropriately protect the recorder main body.

Since the side closed frame body does not interfere with the access to the storage medium through the access portion, the accessibility to the storage medium can be improved.

The saddle-ride type vehicle may further include a rear wheel and a driving source configured to rotationally drive the rear wheel. In this case, it is preferable that the recorder main body is disposed between the driving source and the rear wheel and at a position overlapping with the driving source in the front view.

In this aspect, the recorder main body can be efficiently disposed using a dead space that is likely to be formed between the driving source and the rear wheel. Since the recorder main body can be disposed rearward away from the driving source, it is possible to reduce an influence of heat that may extend from the driving source on the recorder main body.

The saddle-ride type vehicle may further include a seat on which an occupant sits. In this case, the recorder main body can be disposed below the seat and at a position overlapping with the seat in the plan view.

In this aspect, the recorder main body can be covered with the seat from above, and the recorder main body can be appropriately protected.

The saddle-ride type vehicle may further include a side stand configured to support the vehicle body in an inclined state. In this case, it is preferable that the recorder main body is disposed such that the access portion faces a side opposite to the side stand in a vehicle width direction.

In this aspect, when the vehicle body is parked by the side stand inclined in the vehicle width direction, the access portion to the storage medium faces obliquely upward, and thus the storage medium can be easily accessed through the access portion.

Preferably, the recorder main body is disposed such that a center portion thereof is offset to the side opposite to the side stand with respect to a vehicle width center of the vehicle body.

In this aspect, since the access portion approaches the same side as the occupant who tries to access the storage medium, it is possible to further improve accessibility to the storage medium.

The saddle-ride type vehicle may further include a fuel tank attached to a front upper portion of the vehicle body. The vehicle body may include an upper closed frame body assembled to a rear of the fuel tank so as to have a specific closed shape in the top view. In this case, the cover member may be a seat detachably attached to the upper closed frame body, and the recorder main body may be disposed at a position where the access portion is provided inside the upper closed frame body in the top view.

In this aspect, the recorder main body can be protected by the seat in a normal state, and the storage medium in the recorder main body can be easily accessed through the access portion exposed in a state in which the seat is removed.

What is claimed is:

1. A saddle-ride type vehicle comprising:
   a vehicle body;
   a camera attached to the vehicle body;
   a recorder main body including a storage medium that sieves imaging information captured by the camera: and
   a cover member detachably attached to the vehicle body as an exterior component and covering at least an access portion to the storage medium in the recorder main body when the cover member is attached,
   wherein the recorder main body is disposed such that the access portion opens toward the cover member.

2. The saddle-ride type vehicle according to claim 1, wherein
   the recorder main body includes a housing and a memory card as the storage medium, the memory card being removably inserted to an inside of the housing, and
   the access portion is a slot formed in the housing for inserting and removing the memory card.

3. The saddle-ride type vehicle according to claim 1, further comprising:
   a side stand that supports the vehicle body in an inclined state, wherein
   the recorder main body is disposed such that the access portion faces a side opposite to the side stand in a vehicle width direction.

4. The saddle-ride type vehicle according to claim 1, further comprising:
   a fuel tank attached to a front upper portion of the vehicle body, wherein
   the vehicle body includes an upper closed frame body assembled to a rear of the fuel tank to have a predetermined closed shape in a top view of the saddle-ride type vehicle,
   the cover member is a seat detachably attached to the upper closed frame body, and
   the recorder main body is disposed at a position where the access portion is enclosed in the upper closed frame body in the top view.

5. The saddle-ride type vehicle according to claim 1, wherein
   the recorder main body includes a housing, and
   when a line bisecting the housing in a vehicle width direction is defined as a center line and when a center of the vehicle body in a vehicle width direction is defined as a vehicle width center, the recorder main body is disposed such that the center line is offset to a side where the cover member is disposed with respect to the vehicle width center.

6. The saddle-ride type vehicle according to claim 1, wherein
   the vehicle body includes a vehicle body frame and a head portion,
   the vehicle body frame includes a pair of main pipes extending from an upper portion of the head portion while being inclined rearward and downward,
   the pair of main pipes includes a curved portion that are close to each other when viewed from above, and
   the recorder main body is disposed between the pair of main pipes when viewed from above and at the curved portion.

7. The saddle-ride type vehicle according to claim 1, wherein
   the vehicle body includes an engine, a reservoir tank configured to restore cooling water used for cooling the engine, and a side closed frame body assembled to have a specific closed shape in a side view,
   the reservoir tank includes a replenishing port for replenishing the cooling water,
   the cover member is a side cover detachably attached to the side closed frame body, and
   the access portion of the recorder main body and the replenishing port of the reservoir tank are disposed inside the side closed frame body in the side view.

8. A saddle-ride type vehicle comprising:
   a vehicle body;
   a camera attached to the vehicle body;

a recorder main body including a storage medium that stores imaging information captured by the camera;

a cover member detachably attached to the vehicle body as an exterior component and covering at least an access portion to the storage medium in the recorder main body when the cover member is attached;

a rear wheel;

a driving source that rotationally drives the rear wheel;

a case body fixed to the vehicle body between the driving source and the rear wheel in a front-rear direction; and an air cleaner disposed above the driving source and the case body, wherein the recorder main body is supported above the case body and behind the air cleaner, and a front wall of the case body and a rear wall of the air cleaner are close to each other in an upper-lower direction.

* * * * *